US012591425B2

(12) United States Patent
Ishikawa et al.

(10) Patent No.: US 12,591,425 B2
(45) Date of Patent: Mar. 31, 2026

(54) OTA MASTER, UPDATE CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/541,991

(22) Filed: Dec. 3, 2021

(65) Prior Publication Data

US 2022/0244946 A1 Aug. 4, 2022

(30) Foreign Application Priority Data

Feb. 2, 2021 (JP) ................................. 2021-015293

(51) Int. Cl.

| *G06F 9/44* | (2018.01) |
| *G06F 8/654* | (2018.01) |
| *H04L 67/00* | (2022.01) |
| *H04L 67/125* | (2022.01) |
| *H04W 4/48* | (2018.01) |

(52) U.S. Cl.
CPC ............ *G06F 8/654* (2018.02); *H04L 67/125* (2013.01); *H04L 67/34* (2013.01); *H04W 4/48* (2018.02)

(58) Field of Classification Search
CPC ...................................................... G06F 8/654

USPC ......................................................... 717/169
See application file for complete search history.

(56) References Cited

U.S. PATENT DOCUMENTS

| 6,532,152 | B1 * | 3/2003 | White | .............. | G02F 1/133308 |
| | | | | | 312/223.1 |
| 9,015,837 | B1 * | 4/2015 | De Los Reyes | .......... | G06F 8/65 |
| | | | | | 717/172 |
| 10,042,630 | B1 * | 8/2018 | Hisamoto | ................. | G06F 8/65 |
| 10,127,036 | B2 * | 11/2018 | Moeller | .................. | G06F 8/654 |
| 10,466,996 | B2 * | 11/2019 | Kwon | ..................... | G06F 16/13 |
| 10,834,207 | B2 * | 11/2020 | Acharya | ................. | H04L 9/006 |
| 10,871,959 | B2 * | 12/2020 | Nakahara | ................ | G06F 8/654 |
| 11,029,935 | B2 * | 6/2021 | Nakamura | .............. | G06F 1/329 |
| 11,593,091 | B2 * | 2/2023 | Chang | ....................... | G06F 8/65 |
| 11,630,659 | B2 * | 4/2023 | Kobayashi | .............. | G06F 13/00 |
| | | | | | 717/168 |

(Continued)

FOREIGN PATENT DOCUMENTS

| CN | 110262826 A | 9/2019 |
| DE | 10 2017 218 872 A1 | 4/2019 |

(Continued)

*Primary Examiner* — Evral E Bodden
(74) *Attorney, Agent, or Firm* — Oliff PLC

(57) ABSTRACT

An Over-The-Air (OTA) master includes: a communication device configured to receive update data for software on a target electronic control unit from a center; a storage device configured to store the update data; and a processor configured to: control a process of software update for the target electronic control unit based on the update data; cause the storage device to retain the update data until the process of the software update for the target electronic control unit is successfully completed; and delete the update data from the storage device after the process of the software update for the target electronic control unit is successfully completed.

6 Claims, 3 Drawing Sheets

(56) References Cited

U.S. PATENT DOCUMENTS

| 11,714,628 | B2 * | 8/2023 | Miyauchi .................. G06F 8/65 |
| | | | 717/170 |
| 12,014,163 | B2 * | 6/2024 | Sakai ........................ G06F 8/65 |
| 12,079,618 | B2 * | 9/2024 | Revadigar .............. H04L 67/34 |
| 2012/0122424 | A1 * | 5/2012 | Herscovici ........... H04W 24/02 |
| | | | 455/411 |
| 2017/0212746 | A1 * | 7/2017 | Quin ..................... H04L 63/123 |
| 2017/0242678 | A1 * | 8/2017 | Sangameswaran ....... G06F 8/65 |
| 2019/0179629 | A1 | 6/2019 | Roy et al. |
| 2019/0193653 | A1 | 6/2019 | Nakamura |
| 2019/0394277 | A1 * | 12/2019 | Go .......................... H04L 12/66 |
| 2020/0272450 | A1 | 8/2020 | Inoue et al. |
| 2021/0133055 | A1 * | 5/2021 | Nakamura ............... G06F 8/65 |
| 2021/0155252 | A1 | 5/2021 | Harata et al. |
| 2021/0157572 | A1 * | 5/2021 | Harata ................... G06F 8/654 |
| 2021/0191661 | A1 * | 6/2021 | Harata ................. G06F 3/0659 |
| 2021/0382707 | A1 * | 12/2021 | Jeong ....................... G06F 8/65 |
| 2022/0154679 | A1 * | 5/2022 | Kwak ................... B60R 16/033 |
| 2022/0156057 | A1 | 5/2022 | Kobayashi |
| 2022/0365772 | A1 * | 11/2022 | Okamoto ............... G06F 13/00 |

FOREIGN PATENT DOCUMENTS

| JP | 2004-326689 A | 11/2004 |
| JP | 2018-37059 A | 3/2018 |
| JP | 2020-027630 A | 2/2020 |
| JP | 2020-132026 A | 8/2020 |
| JP | 2020-152154 A | 9/2020 |

* cited by examiner

FIG. 3

OTA MASTER, UPDATE CONTROL METHOD, NON-TRANSITORY STORAGE MEDIUM, AND VEHICLE

CROSS-REFERENCE TO RELATED APPLICATION

This application claims priority to Japanese Patent Application No. 2021-015293 filed on Feb. 2, 2021, incorporated herein by reference in its entirety.

BACKGROUND

1. Technical Field

The present disclosure relates to an over-the-air (OTA) master, an update control method, a non-transitory storage medium, and a vehicle.

2. Description of Related Art

A vehicle is equipped with a plurality of electronic control units (ECUs) that controls operation of a vehicle. Each ECU includes a processor, a temporary storage unit such as a random access memory (RAM), and a non-volatile storage unit such as a flash read-only memory (ROM). The processor of each ECU implements control functions of that ECU by executing software stored in the non-volatile storage unit. The software stored in each ECU is rewritable, and it is possible to improve the functions of each ECU or add a new vehicle control function to each ECU by updating the software to a newer version.

An over-the-air (OTA) technique is an example of a technique of updating software on an ECU. In the OTA technique, a program on the ECU is updated or a program is added to the ECU by wirelessly connecting an in-vehicle communication device connected to an in-vehicle network to a communication network such as the Internet, downloading software from a server via wireless communication, and installing the downloaded software (see, e.g., Japanese Unexamined Patent Application Publication No. 2004-326689 (JP 2004-326689 A)).

There are two types of non-volatile storage units that are mounted on the ECU: memories (single-bank memories) having one data storage area for storing data such as a program and memories (dual-bank memories) having two data storage areas for storing data such as a program. Either of these two types of memories is used depending on the specifications of the ECU etc.

SUMMARY

When a software update on an ECU to be updated fails, it is desired to be able to retry and quickly complete the software update. However, a software update can take a long time when, for example, the communication environment becomes poor during retry of the software update. Especially for an ECU with a single-bank memory, if a software update process fails in the middle, the ECU cannot be operated. This causes inconvenience when there is an emergency to use a vehicle. Accordingly, there is room for improvement.

The present disclosure provides an OTA master, an update control method, a non-transitory storage medium, and a vehicle that can improve software updates on an electronic control unit.

An OTA master according to a first aspect of the present disclosure includes: a communication device configured to receive update data for software on a target electronic control unit from a center; a storage device configured to store the update data; and a processor configured to: control a process of software update for the target electronic control unit based on the update data; cause the storage device to retain the update data until the process of the software update for the target electronic control unit is successfully completed; and delete the update data from the storage device after the process of the software update for the target electronic control unit is successfully completed.

A software update control method according to a second aspect of the present disclosure is performed by a computer including a processor, a memory, and a storage device. The software update control method includes: receiving update data for software on a target electronic control unit from a center; storing the update data in the storage device; controlling a process of software update for the target electronic control unit based on the update data; retaining the update data until the process of the software update for the target electronic control unit is successfully completed; and deleting the update data from the storage device after the process of the software update for the target electronic control unit is successfully completed.

A non-transitory storage medium according to a third aspect of the present disclosure stores a software update control program that is executable by a computer including a processor, a memory, and a storage device and that causes the computer to perform functions including: receiving update data for software on a target electronic control unit from a center; storing the update data in the storage device; controlling a process of software update for the target electronic control unit based on the update data; retaining the update data until the process of the software update for the target electronic control unit is successfully completed; and deleting the update data from the storage device after the process of the software update for the target electronic control unit is successfully completed.

A vehicle according to a fourth aspect of the present disclosure may include the OTA master according to the first aspect.

The present disclosure can provide an OTA master, an update control method, a non-transitory storage medium, and a vehicle that can improve software updates on an electronic control unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart of a software update control process that is performed by the OTA master according to the embodiment.

DETAILED DESCRIPTION OF EMBODIMENTS

Figure 1:
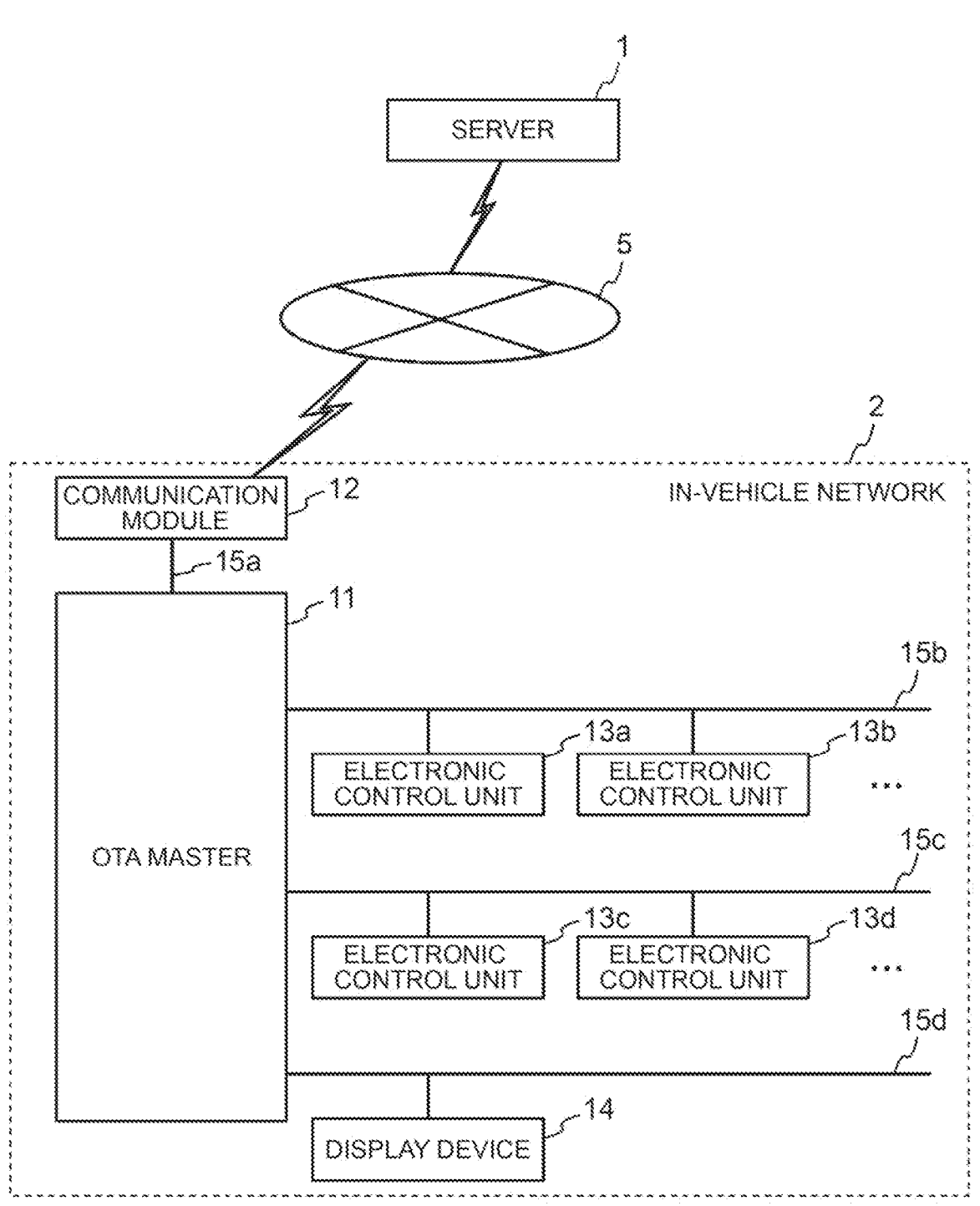
FIG. 1 is a block diagram showing an overall configuration of a network system according to an embodiment.

FIG. 1 is a block diagram showing an overall configuration of a network system according to an embodiment.

A network system shown in FIG. 1 is a system for updating software on electronic control units 13a to 13d mounted on a vehicle, and includes a server 1 (center) and an in-vehicle network 2 that is mounted on the vehicle.

The server 1 can communicate with an OTA master 11 mounted on the vehicle via a network 5, and manages software updates on the electronic control units 13a to 13d mounted on the vehicle.

The server 1 includes a central processing unit (CPU), a RAM, a storage device having a readable and writable storage medium such as hard disk and solid state drive (SSD), and a communication device for communicating with the OTA master 11 via the network 5. The storage device stores a program for managing software updates, information to be used for the software update management, and update data for the electronic control units. In the server 1, the CPU controls transmission of the update data to the OTA master 11 by executing the program read from the storage device using the RAM as a working area.

The in-vehicle network 2 includes the OTA master 11, a communication module 12, the electronic control units (ECUs) 13a to 13d, and a display device 14. The OTA master 11 is connected to the communication module 12 via a bus 15a, is connected to the electronic control units 13a, 13b via a bus 15b, is connected to the electronic control units 13c, 13d via a bus 15c, and is connected to the display device 14 via a bus 15d. The communication module 12 is a communication device that connects the in-vehicle network 2 and the server 1.

The OTA master 11 includes a microcomputer and a communication device. The microcomputer includes a CPU, a RAM, a ROM, and a storage device. In the OTA master 11, the CPU of the microcomputer performs a control process that will be described later by executing a program read from the ROM or the storage device using the RAM as a working area. The communication device is a device that communicates with the communication module 12, the electronic control units 13a to 13d, and the display device 14 via the buses 15a to 15d shown in FIG. 1. The OTA master 11 can wirelessly communicate with the server 1 via the communication module 12. The OTA master 11 controls a software update on the electronic control unit of which software is a target of the software update (the electronic control unit to be updated, target electronic control unit) out of the electronic control units 13a to 13d, based on the update data acquired from the server 1. The OTA master 11 is sometimes referred to as the master device or the central gateway.

The electronic control units 13a to 13d control devices such as actuators and sensors mounted on the vehicle. The display device 14 (human-machine interface (HMI)) is used to display various indications such as an indication that there is update data, an accept request screen that requests a user or an administrator to accept a software update, an update result, etc. during a software update process for the electronic control units 13a to 13d. A typical example of the display device 14 is a display device for a car navigation system. However, the display device 14 is not particularly limited as long as it can display information necessary for a program update process. Although the four electronic control units 13a to 13d are illustrated in FIG. 1, the number of electronic control units is not particularly limited. In addition to the display device 14, an electronic control unit may further be connected to the bus 15d shown in FIG. 1.

Each of the electronic control units 13a to 13d includes a CPU, a RAM, a non-volatile memory (storage), and a communication device. The CPU of each electronic control unit 13a to 13d implements functions of that electronic control unit by executing software (program) read from the non-volatile memory using the RAM as a working area. There are two types of electronic control units: those having one data storage area for storing software and those having two data storage areas for storing software. In the data storage area (bank) of the electronic control unit, version information, parameter data, a boot program for booting, a program for software updates, etc. are sometimes stored in addition to the software for implementing the functions of the electronic control unit. In the electronic control units having one data storage area (one bank, single-bank memories), installing update data in the data storage area affects the software on the electronic control unit. On the other hand, in the electronic control units having two data storage areas (two banks, dual-bank memories), one of the two data storage areas is used as a storage area to be read (active bank), and software stored in the storage area to be read is executed. Update data can be written in the background to the other storage area that is not to be read (inactive bank, write bank) during execution of a program stored in the storage area to be read (active bank). During activation in the software update process, the updated version of the software can be activated by switching the storage area from which the CPU reads the program.

In the present disclosure, the electronic control units having two data storage areas include: an electronic control unit having a memory with a configuration called "one-bank suspend memory" in which one data storage area of the non-volatile memory is divided into two banks in a pseudo manner and, during execution of a program stored in one bank of the two banks, a program can be written on the other of the two banks; and an electronic control unit which has an expansion non-volatile memory having a one-bank data storage area in addition to a non-volatile memory having a one-bank data storage area and in which these two non-volatile memories can be used as an active bank and an inactive bank.

The software update process is composed of a phase of downloading the update data from the server 1, a phase of transferring the downloaded update data to the electronic control unit to be updated and installing the update data in the storage area of the electronic control unit to be updated, and an activation phase of activating the updated version of the software installed in the electronic control unit to be updated.

Downloading is a process of receiving the update data for updating the software on the electronic control unit from the server 1 and storing the received update data. The download phase includes control of a series of processes related to downloading, such as determination as to whether download can be performed and verification of the update data, in addition to reception of the update data. Installation is a process of writing an updated version of the program (update software) in the storage area of the electronic control unit to be updated, based on the downloaded update data. The installation phase includes control of a series of processes related to installation, such as determination as to whether installation can be executed, transfer of the update data, and verification of the updated version of the program, in addition to execution of installation. Activation is a process of activating the installed updated version of the program. The activation phase includes control of a series of processes related to activation, such as determination as to whether activation can be executed and verification of the activation result, in addition to execution of activation.

The update data that is sent from the server 1 to the OTA master 11 may include any of update software for the electronic control unit, compressed data of the update software, and divided data of the update software or the compressed data. The update data may include an identifier that identifies the electronic control unit to be updated (ECU ID)

and an identifier that identifies the software before update (ECU software ID). The update data is downloaded as a distribution package. The distribution package contains the update data for one or more electronic control units.

When the update data includes the update software itself, the OTA master 11 transfers the update data (update software) to the electronic control unit to be updated during the installation phase. When the update data includes compressed data, difference data, or divided data of the update software, the OTA master 11 may transfer the update data to the electronic control unit to be updated and the electronic control unit to be updated may generate the update software from the update data. Alternatively, the OTA master 11 may generate the update software from the update data and then transfer the generated update software to the electronic control unit to be updated. The update software can be generated by decompressing the compressed data or assembling the difference data or the divided data.

The electronic control unit to be updated can install the update software based on an installation request from the OTA master 11. Alternatively, the electronic control unit to be updated that has received the update data may autonomously install the update software without receiving an explicit instruction from the OTA master 11.

The electronic control unit to be updated can activate the update software based on an activation request from the OTA master 11. Alternatively, the electronic control unit to be updated that has received the update data may autonomously activate the update software without receiving an explicit instruction from the OTA master 11.

The software update process can be performed successively or in parallel for each of the electronic control units.

The "program update process" in the present specification includes not only a process in which all of the download, installation, and activation are performed successively but also a process in which only a part of the download, installation, and activation is performed.

Figure 2:
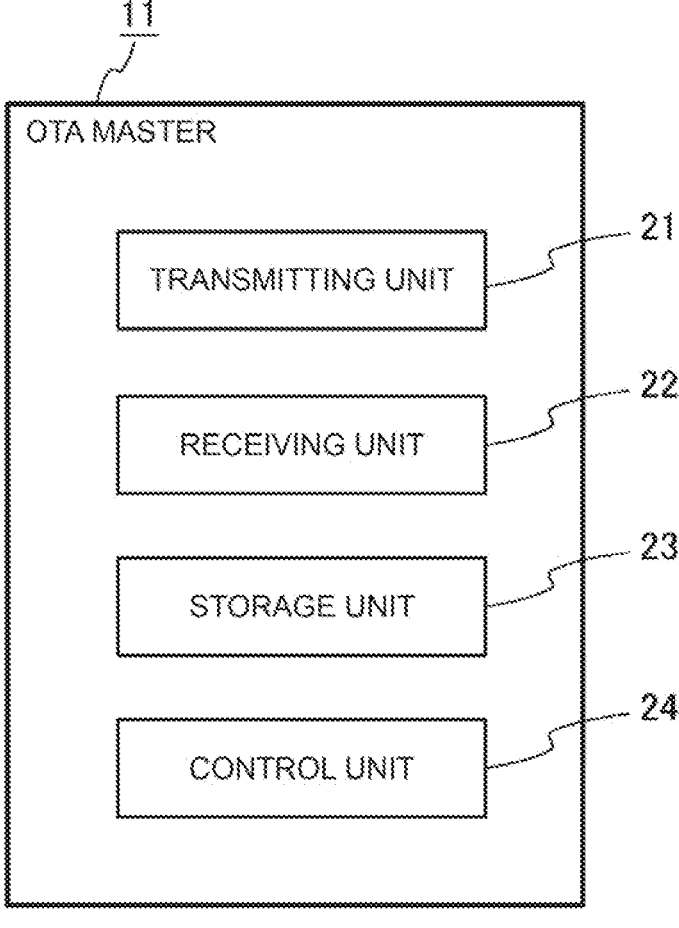
FIG. 2 is a functional block diagram of an OTA master according to the embodiment.

FIG. 2 is a functional block diagram of the OTA master according to the embodiment.

The OTA master 11 includes a transmitting unit 21, a receiving unit 22, a storage unit 23, and a control unit 24.

For example, the transmitting unit 21 sends an update confirmation request to the server 1 when the power supply or ignition of the vehicle is turned on. The update confirmation request is a request to confirm whether there is update data for software. The update confirmation request includes a vehicle identification (ID) (vehicle identification number (VIN)) that identifies the vehicle and the version of the software on the electronic control units 13*a* to 13*d* connected to the in-vehicle network 2. The vehicle ID and the version of the software on the electronic control units 13*a* to 13*d* are used to determine whether there is update data for the software on the electronic control units 13*a* to 13*d* by comparison with the latest version of the software retained in the server 1 for each vehicle ID or each vehicle model identified by the vehicle ID. When it is determined based on a response to the update confirmation request that there is update data for the software on any of the electronic control units 13*a* to 13*d*, the transmitting unit 21 sends an update data download request to the server 1.

The receiving unit 22 receives the confirmation result indicating whether there is update data from the server 1 as the response to the update confirmation request. After the transmitting unit 21 sends the update data download request to the server 1, the receiving unit 22 receives update data for the software on the electronic control unit of which software is a target of the software update (electronic control unit to be updated, target electronic control unit) from the server 1. The update data is sent from the server 1 as a distribution package. The distribution package may include, in addition to the update data, verification data for verifying the authenticity of the update data, the number of pieces of the update data, the order of installation of the update data, various kinds of control information to be used during software update, etc. The receiving unit 22 stores the received distribution package in the storage unit 23.

The storage unit 23 stores the distribution package received by the receiving unit 22. The storage unit 23 can be used to store, in addition to the update data (distribution package), data related to other control functions that are performed by the OTA technique, during software update by the OTA master 11.

The control unit 24 determines whether there is update data for the software on the electronic control unit, based on the confirmation result received by the receiving unit 22 from the server 1 in response to the update confirmation request. When the receiving unit 22 receives the distribution package containing the update data from the server 1, the control unit 24 verifies the authenticity of the received distribution package. Verification of the authenticity herein means verifying the integrity and correctness of data. The authenticity can be verified using, for example, a vehicle ID (VIN) and a digital signature. The control unit 24 controls the software update process for the target electronic control unit. The software update process that is performed by the control unit 24 will be described in detail below.

Figure 3:
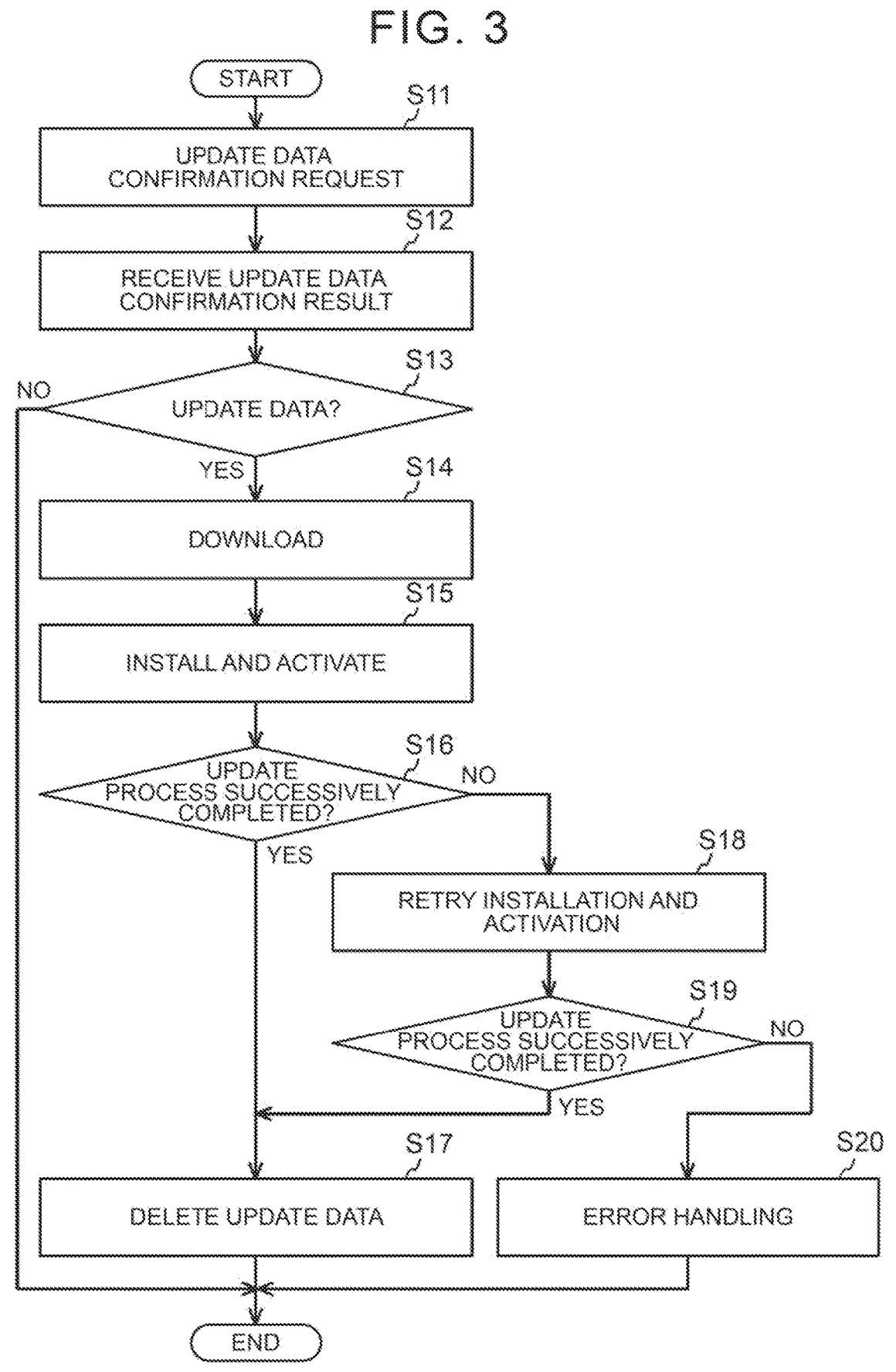

FIG. 3 is a flowchart of the software update control process that is performed by the OTA master according to the embodiment. For example, the control process shown in FIG. 3 is performed when the power supply or ignition of the vehicle is turned on.

In step S11, the transmitting unit 21 sends a request to confirm whether there is update data for the software on the electronic control unit to the server 1. The update data confirmation request includes a combination of the vehicle ID and the version of the software on the electronic control unit. The process then proceeds to step S12.

In step S12, the receiving unit 22 receives the confirmation result for the update data confirmation request from the server 1. The process then proceeds to step S13.

In step S13, the control unit 24 determines whether there is update data for the software on any of the electronic control units 13*a* to 13*d*, based on the confirmation result received in step S12. When YES in step S13, the process proceeds to step S14. Otherwise, the process ends.

In step S14, the update data is downloaded. More specifically, the transmitting unit 21 sends a request to download a distribution package to the server 1, and the receiving unit 22 receives the distribution package sent in response to the download request. The receiving unit 22 stores the received distribution package in the storage unit 23. The control unit 24 verifies the authenticity of the update data contained in the received distribution package. In step S14, the control unit 24 may determine before the download whether the download can be performed. In step S14, after the download is completed, the transmitting unit 21 may send a notification that the download is completed to the server 1. The process then proceeds to step S15.

In step S15, the control unit 24 performs an installation process and an activation process for the target electronic control unit. More specifically, the control unit 24 transfers the update data contained in the distribution package to the target electronic control unit and instructs the target electronic control unit to install the update data. The target electronic control unit writes the update data received from the OTA master 11 to the data storage area. The control unit 24 then instructs the target electronic control unit to activate the updated version of the software. The target electronic control unit is restarted when a specific operation such as turning off of the power supply or ignition is performed, and executes the updated software. The process then proceeds to step S16.

When the target electronic control unit includes a single-bank memory, the software on the target electronic control unit is affected as soon as the update data is installed in the data storage area. Therefore, the installation process and the activation process may be performed successively. In this case, when the target electronic control unit has one data storage area, an accept request process for both installation and activation may be performed before execution of the installation, and an accept request process before execution of the activation may be omitted.

The control unit 24 may perform a process of determining whether the installation can be executed and an accept request process for the installation before execution of the installation. For example, as the accept request process for the installation, the control unit 24 causes the display device 14 to display an indication that a software update on the electronic control unit is started, a request to the user to accept the software update, and if necessary, the time required to install the update data and restrictions and cautions during installation, and receives an operation input performed by the user using input means such as touch panel or operation button. The control unit 24 then determines whether an operation input accepting the software update (installation) has been performed. For example, whether the operation input accepting the installation has been performed can be determined based on whether a button such as "accept" or "start update" displayed on the display device 14 has been pressed. When the user does not want to accept start of the software update (installation) immediately but wants to start the software update (installation) later, such an intention can be received when a button such as "later" is pressed.

Similarly, the control unit 24 may perform a process of determining whether the activation can be executed and an accept request process for the activation before execution of the activation. For example, as the accept request process for the activation, the control unit 24 causes the display device 14 to display an indication that the software update on the electronic control unit is ready to be performed and that the program will be updated when a specific operation such as turning off of the power supply or ignition is performed, and if necessary, the time required for the activation and restrictions and cautions during the activation, and receives an operation input performed by the user using the input means such as touch panel or operation button. The control unit 24 then determines whether an operation input accepting the software update (activation) has been performed. For example, whether the operation input accepting the activation has been performed can be determined based on whether a button such as "accept" or "update" displayed on the display device 14 has been pressed. When the user does not want to accept the software update (activation) immediately but wants to perform the software update later, such an intention can be received when a button such as "later" is pressed.

In step S16, the control unit 24 determines whether the software update process for the target electronic control unit has been successfully completed. The control unit 24 makes the determination of step S16 based on a notification from the target electronic control unit. For example, the control unit 24 determines that the software update process for the target electronic control unit has been successfully completed when the control unit 24 acquires from the target electronic control unit a notification that the updated software has been successfully activated and identification information of the activated software on the target electronic control unit and confirms based on the acquired information that the software on the target electronic control unit has been updated with appropriate software. When YES in step S16, the process proceeds to step S17. Otherwise, the process proceeds to step S18.

In step S17, the control unit 24 deletes the update data stored in the storage unit 23. The control unit 24 may sequentially delete the update data for each target electronic control unit or may delete the entire distribution package when the software update process is successfully completed in all of the target electronic control units. Thereafter, the process ends.

In step S18, the control unit 24 retries the installation process and the activation process for any target electronic control unit for which the software update process has not been successfully completed. When the software update process for the target electronic control unit is not successfully completed, the control unit 24 does not delete the update data for the software on the target electronic control unit but causes the storage unit 23 to retain the update data for the software on the target electronic control unit. This allows the control unit 24 to promptly retry the software update process based on the update data retained in the storage unit 23 without re-downloading the update data for the software on the target electronic control unit from the server 1.

In step S18, as in step S15, the control unit 24 transfers the update data contained in the distribution package to the target electronic control unit and instructs the target electronic control unit to install the update data. The target electronic control unit writes the update data received from the OTA master 11 to the data storage area. The control unit 24 then instructs the target electronic control unit to activate the updated version of the software. The target electronic control unit is restarted when a specific operation such as turning off of the power supply or ignition is performed, and executes the updated software. The process then proceeds to step S19.

In step S19, the control unit 24 determines whether the software update process for the target electronic control unit has been successfully completed. As in step S16, the control unit 24 acquires from the target electronic control unit a notification that the updated software has been successfully activated and identification information of the activated software on the target electronic control unit. The control unit 24 determines that the software update process for the target electronic control unit has been successfully completed when the control unit 24 confirms based on the acquired information that the software on the target electronic control unit has been updated with appropriate software. When YES in step S19, the process proceeds to step S17. Otherwise, the process proceeds to step S20.

In step S20, the control unit 24 performs error handling. As the error handling, the control unit 24 may perform, for example, one of the following processes: a software rollback process for the target electronic control unit, giving a notification that the software update on the electronic control unit has failed, and giving a notification encouraging the user to have it fixed at a dealership or a repair shop. Thereafter, the process ends.

In the example shown in FIG. 3, error handling is performed (S20) when the installation process and the activation process are retried once (S18) and the software update is not successfully completed (NO in S19). Steps S18 and S19 may be repeated a plurality of times.

As described above, the OTA master 11 according to the present embodiment retains the update data in the storage unit 23 until the software update process for the target electronic control unit is successfully completed. The OTA master 11 deletes the update data from the storage unit 23 after the software update process for the target electronic control unit is successfully completed. Accordingly, the update data retained in the storage unit 23 can be reused when the software update process for the target electronic control unit is not successfully completed.

In the present embodiment, when the software update process for the target electronic control unit is not successfully completed, the control unit 24 retries the software update process based on the update data retained in the storage unit 23. With this control, the target electronic control unit can be quickly updated regardless of the communication condition.

Although the memory in the target electronic control unit may be either a single-bank memory or a dual-bank memory, the OTA master 11 according to the present embodiment is particularly effective when the target electronic control unit includes a single-bank memory. When the memory in the target electronic control unit is a dual-bank memory in which, during execution of a program stored in one bank of two banks, a program can be written on the other of the two banks, the electronic control unit can be operated using the software before update even if a software update fails. On the other hand, when the memory in the target electronic control unit includes a single-bank memory, the software before update is rewritten by installation of the updated version of the software. Therefore, the electronic control unit cannot be operated using the software before update if the software update process fails. That is, it is preferable that, when a software update on the target electronic control unit including a single-bank memory fails, the software update process be able to be retried as soon as possible. When a software update on the target electronic control unit fails, the OTA master 11 according to the present embodiment can retry the software update process in the shortest possible time by using the update data retained in the storage unit 23. The OTA master 11 according to the present embodiment can thus quickly restore the failure.

As described above, when a software update on the electronic control unit having a dual-bank memory fails, the electronic control unit can continue to be operated using the software before update. Therefore, when the target electronic control unit has a dual-bank memory, the control unit 24 may delete the update data from the storage unit 23 after transfer of the update data to the target electronic control unit is completed in the installation process. The control unit 24 causes the storage unit 23 to retain the update data for the target electronic control unit including a single-bank memory until the software update process is successfully completed. On the other hand, by deleting the update data for the software on the target electronic control unit with the dual-bank memory that can be operated with the software before update even after the software update process is started, the storage capacity of the storage unit 23 of the OTA master 11 is secured and the influence on other control processes is reduced.

Other Modifications

The functions of the OTA master 11 illustrated in the above embodiment may be implemented as a software update control method that is performed by an in-vehicle computer including a processor (CPU), a memory, and a storage device, as a software update control program that causes the in-vehicle computer to perform the functions, or as a computer-readable non-transitory storage medium storing the software update control program. The functions of the OTA master 11 illustrated in the above embodiment may also be implemented as a microcomputer equipped with a software update control method or a microcomputer having an update control program installed in a storage device.

In the example described in the above embodiment, the OTA master 11 on the in-vehicle network controls program updates on all the electronic control units 13a to 13d. However, instead of providing the OTA master 11, one of the electronic control units 13a to 13d may have the update control function shown in FIG. 3 and may control software updates on the other electronic control units. Instead of providing the OTA master 11, an external device that can be connected to the in-vehicle network 2 by wire may have the update control function shown in FIG. 3, and the program update process for the electronic control units 13a to 13d may be performed using this external device.

The disclosed technique can be used in a network system for updating a program for an electronic control unit.

What is claimed is:

1. An Over-The-Air (OTA) master, comprising:
a communication device configured to receive information related to an update of software on a target electronic control unit from a center, the target electronic control unit including a single-bank memory;
a storage device configured to store the information related to the update; and
a processor configured to:
control a process of software update for the target electronic control unit based on the information related to the update;
acquire a completion notification and identification information, the completion notification indicating that the software update has been completed, and the identification information being information on updated software of the target electronic control unit to which the process of the software update has been applied;
determine whether the process of the software update for the target electronic control unit has been successfully completed based on the acquired identification information; and
cause the storage device to retain the information related to the update including the information related to the update for which the completion notification has been acquired even after the completion notification is acquired and until the process of the software update for the target electronic control unit is determined to have been successfully completed in that the target electronic control unit has successfully activated the software update,
wherein the processor is configured to retry the software update for the target electronic control unit based on the information related to the update retained in the storage device when the target electronic control unit has not successfully completed an activation of the software update, and
wherein the completion notification is acquired and the activation of the software update are performed successively.

2. The OTA master according to claim 1, wherein the process of the software update includes transferring the information related to the update to the target electronic control unit in the process of the software update, and the processor is configured to cause the storage device to retain the information related to the update for the target electronic control unit upon transferring the information related to the update to the target electronic control unit and until the process of the software update for the target electronic control unit is determined to have been successfully completed.

3. The OTA master according to claim 1, wherein the target electronic control unit is mounted in a vehicle and an electronic control unit of which software is a target of the software update.

4. A vehicle comprising the OTA master according to claim 1.

5. A software update control method that is performed by a device mounted on a vehicle, the software update control method comprising:

receiving information related to an update of software on a target electronic control unit from a center, the target electronic control unit including a single-bank memory;

storing the information related to the update in a storage device;

controlling a process of software update for the target electronic control unit based on the information related to the update;

acquiring a completion notification and identification information, the completion notification indicating that the software update has been completed, and the identification information being information on updated software of the target electronic control unit to which the process of the software update has been applied;

determining whether the process of the software update for the target electronic control unit has been successfully completed based on the acquired identification information; and retaining the information related to the update including the information related to the update for which the completion notification has been acquired even after the completion notification is acquired and until the process of the software update for the target electronic control unit is determined to have been successfully completed in that the target electronic control unit has successfully activated the software update, wherein the software update for the target electronic control unit is retried based on the information related to the update retained in the storage device when the target electronic control unit has not successfully completed an activation of the software update, and wherein the completion notification is acquired and the activation of the software update are performed successively.

6. A non-transitory storage medium storing a software update control program that is executable by a device mounted on a vehicle and that causes the device to perform functions comprising:

receiving information related to an update of software on a target electronic control unit from a center, the target electronic control unit including a single-bank memory;

storing the information related to the update in a storage device;

controlling a process of software update for the target electronic control unit based on the information related to the update;

acquiring a completion notification and identification information, the completion notification indicating that the software update has been completed, and the identification information being information on updated software of the target electronic control unit to which the process of the software update has been applied;

determining whether the process of the software update for the target electronic control unit has been successfully completed based on the acquired identification information; and retaining the information related to the update including the information related to the update for which the completion notification has been acquired even after the completion notification is acquired and until the process of the software update for the target electronic control unit is determined to have been successfully completed in that the target electronic control unit has successfully activated the software update, wherein the software update for the target electronic control unit is retried based on the information related to the update retained in the storage device when the target electronic control unit has not successfully completed an activation of the software update, and wherein the completion notification is acquired and the activation of the software update are performed successively.

* * * * *